United States Patent
Yamamoto et al.

(10) Patent No.: US 7,544,762 B2
(45) Date of Patent: *Jun. 9, 2009

(54) CATALYST FOR PREPARATION OF POLYESTER AND PROCESS FOR PREPARING POLYESTER USING THE CATALYST

(75) Inventors: Tomoyoshi Yamamoto, Matsuyama (JP); Hiroki Nagano, Matsuyama (JP); Minoru Suzuki, Matsuyama (JP); Hiroshi Toyao, Matsuyama (JP); Tomoyuki Kishino, Matsuyama (JP); Nobuo Minobe, Matsuyama (JP); Ryoji Tsukamoto, Matsuyama (JP); Kenichi Ishihara, Matsuyama (JP)

(73) Assignee: Teijin Limited, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/483,611

(22) PCT Filed: Jul. 16, 2002

(86) PCT No.: PCT/JP02/07231

§ 371 (c)(1),
(2), (4) Date: Jan. 14, 2004

(87) PCT Pub. No.: WO03/008479

PCT Pub. Date: Jan. 30, 2003

(65) Prior Publication Data

US 2004/0176564 A1    Sep. 9, 2004

(30) Foreign Application Priority Data

| Jul. 16, 2001 | (JP) | 2001-214916 |
| Oct. 5, 2001 | (JP) | 2001-309662 |
| Oct. 10, 2001 | (JP) | 2001-312385 |
| Oct. 12, 2001 | (JP) | 2001-315129 |
| Mar. 26, 2002 | (JP) | 2002-085691 |
| Mar. 26, 2002 | (JP) | 2002-085692 |

(51) Int. Cl.
*C08G 63/00* (2006.01)
*C08G 63/85* (2006.01)

(52) U.S. Cl. ......... 528/279; 528/286; 528/302; 528/208; 502/102; 502/103; 502/111; 502/121; 502/127

(58) Field of Classification Search ......... 502/102, 502/103, 111, 121, 127, 150, 11; 528/279, 528/286, 302, 308, 308.6, 710, 711, 713, 528/783; 524/710, 711, 713, 750

See application file for complete search history.

(56) References Cited

U.S. PATENT DOCUMENTS 4,131,601 A    12/1978    Hashimoto et al.

6,303,738 B1 *  10/2001  Putzig et al. ......... 528/271

FOREIGN PATENT DOCUMENTS

| EP | 0 634 435 A1 | 1/1995 |
| EP | 1 110 988 A1 | 6/2001 |
| EP | 1 178 067 A2 | 2/2002 |
| JP | 47-26597 B | 7/1972 |
| JP | 48-2229 B | 1/1973 |
| JP | 53-24392 A | 3/1978 |
| JP | 54-43295 A | 4/1979 |
| JP | 58-38722 A | 3/1983 |
| JP | 59-46258 | * 11/1984 |
| JP | 59-46258 B | 11/1984 |
| JP | 61-174223 A | 8/1986 |
| JP | 7-138354 A | 5/1995 |
| JP | 7-323511 A | 12/1995 |
| JP | 8-283393 A | 10/1996 |
| JP | 2000-879 A | 1/2000 |
| WO | WO 96/19520 A1 | 6/1996 |
| WO | WO 99/28033 | * 6/1999 |
| WO | WO 99/28033 A1 | 6/1999 |
| WO | WO 99/54039 A1 | 10/1999 |

* cited by examiner

*Primary Examiner*—Irina S Zemel
(74) *Attorney, Agent, or Firm*—Sughrue Mion, PLLC

(57) ABSTRACT

A polyester having a good color tone (a high L value and a low b value) and a low acetaldehyde content is obtained by using a catalyst containing a reaction product of (A) a titanium compound (1) represented by the general formula (I) and/or a titanium compound (2) obtained by reacting the titanium compound (1) of the general formula (I) with an aromatic polyhydric carboxylic acid represented by the general formula (II) or an anhydride thereof, with (B) a phosphorus compound (3) represented by the general formula (III).

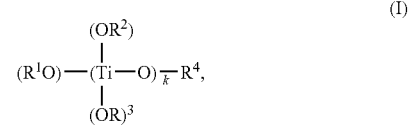

(I)

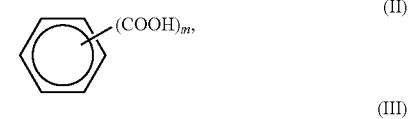

(II)

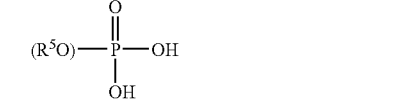

(III)

[wherein $R^1$, $R^2$, $R^3$, $R^4$ and $R^5$=a $C_2$-$C_{10}$ alkyl group, k=1 to 3, m=2 to 4, and $R^6$=a substituted or non-substituted $C_6$-$C_{20}$ aryl group or a $C_6$-$C_{20}$ alkyl group].

27 Claims, No Drawings

CATALYST FOR PREPARATION OF POLYESTER AND PROCESS FOR PREPARING POLYESTER USING THE CATALYST

TECHNICAL FIELD

The present invention relates to a catalyst for the preparation of a polyester and a process for preparing a polyester using the catalyst. More particularly, the present invention relates to a catalyst, for the preparation of a polyester, which comprises a specific titanium compound and a specific phosphorus compound, and a process for preparing a polyester having a good color tone (b value), using the catalyst, without requiring the addition of a cobalt compound for adjusting a color tone.

BACKGROUND ART

Polyesters, particularly polyethylene terephthalate, polyethylene naphthalate, polytrimethylene terephthalate and polytetramethylene terephthalate are widely employed for fibers, films and other molded articles due to the excellent mechanical, physical and chemical performances thereof.

As the process for preparing polyethylene terephthalate, for example, there is known a process in which a reaction product comprising an ethylene glycol ester of terephthalic acid and/or a low polymerization degree polymer thereof is prepared by directly esterifying terephthalic acid with ethylene glycol, or transesterifying a lower alkyl ester of terephthalic acid, such as dimethyl terephthalate, with ethylene glycol, or reacting terephthalic acid with ethylene oxide and the reaction product is polycondensed under a reduced pressure in the presence of a polymerization catalyst so that a predetermined polymerization degree is attained. Also polyethylene naphthalate, polytrimethylene terephthalate and polytetramethylene terephthalate are prepared by the same process as described above.

It is well known that the reaction rate and the quality of the resulting polyester are greatly influenced by the type of the catalyst used in the polycondensation reaction described above. As the polycondensation catalyst of polyethylene terephthalate, an antimony compound is most widely used. The antimony compound catalyst has excellent polycondensation catalytic activity and the polyester obtained by using the same has a good color tone.

However, when the antimony compound is used as the polycondensation catalyst, there arises the following problem. That is, if the resulting polyester is continuously melt-spun for a long time, around a spinneret for melt spinning, foreign matter (hereinafter sometimes merely referred to as spinneret foreign matter) is deposited thereby to cause a bending phenomenon of a molten polymer stream extruded through the spinneret, which leads to the occurrence of fuzz and/or breakage of fiber yarns obtained in the spinning step and/or the drawing step.

It is also proposed to use, as the polycondensation catalyst other than the antimony compound, a titanium compound, for example, titanium tetrabutoxide. When using such a titanium compound, the above problem caused by the deposition of the spinneret foreign matter can be solved, while the resulting polyester itself is colored yellow and a new problem, that the thermal stability of the melt decreases, occurs.

To solve the coloration problem, a cobalt compound as a color tone adjustor is generally added to the polyester, thereby to reduce the yellowish tone. Although the color tone (b value) of the polyester is certainly improved by adding the cobalt compound, there arises a problem that the addition of the cobalt compound causes the thermal stability of the polyester melt to decrease and thus the resistance of the polymer to decomposition to decrease.

Japanese Examined Patent Publication (Kokoku) No. 48-2229 discloses that, as another catalyst for preparation of a polyester, titanium hydroxide can be used. Also, Japanese Examined Patent Publication (Kokoku) No. 47-26597 discloses that titanic acid can be used as a catalyst for preparation of a polyester. However, in the former process, titanium hydroxide is hard to form into a powder while, in the latter process, α-titanic acid is hard to store and handle because it is likely to deteriorate. Therefore, the above-mentioned catalyst is not suited for use in the industrial field and also a polymer having a good color tone (b value) is hard to obtain, using the same.

Japanese Examined Patent Publication (Kokoku) No. 59-46258 discloses use of, as a catalyst for preparation of a polyester, a product obtained by reacting a titanium compound with trimellitic acid. Also, Japanese Unexamined Patent Publication (Kokai) No. 58-38722 discloses use of, as a catalyst for preparation of a polyester, a product obtained by reacting a titanium compound with a phosphite ester. Although the thermal stability of the melt of the polyester is certainly improved to some extent by this processes, the resulting polyesters have insufficient color tone. Therefore, further a improvement in the color tone of the polyester is required.

Furthermore, Japanese Unexamined Patent Publication (Kokai) No. 7-138354 proposes use of a complex of a titanium compound with a phosphorus compound as a catalyst for the preparation of a polyester. Although the thermal stability of the melt of the polyester is certainly improved to some extent by this process, the resulting polyester has an unsatisfactory color tone.

DISCLOSURE OF THE INVENTION

An object of the present invention is to provide a catalyst, for the preparation of a polyester, which has a good color tone (b value) and contains less foreign matter and is also superior in thermal stability when being melted, and a process for preparing a polyester using the catalyst.

The above object can be attained by the catalyst of the present invention for preparation of a polyester and the process of the present invention for preparing a polyester using the catalyst.

The catalyst of the present invention, for preparation of a polyester, comprises a reaction product of:

(A) a titanium compound component comprising of at least one member selected from titanium compounds (1) represented by the general formula (I):

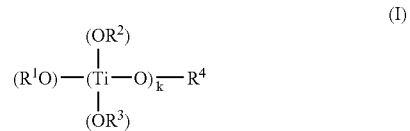

in which formula (I), $R^1$, $R^2$, $R^3$ and $R^4$ respectively and independently from each other represents an alkyl group having 2 to 10 carbon atoms, k represents an integer of 1 to 3 and, when k is 2 or 3, two or three $R^2$ and $R^3$ substituents may be the same as or different from each other, and a titanium compound (2) obtained by reacting the titanium compound (1) of the general formula (I) with aromatic polycarboxylic acids represented by the general formula (II):

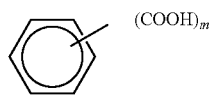 (II)

in which formula (II), m represents an integer of 2 to 4, or anhydrides of the acids of the formula (II); and (B) a phosphorus compound component comprising at least member of phosphorus compounds (3) represented by the general formula (III):

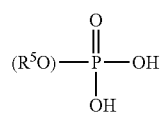 (III)

in which formula (III), $R^5$ represents a non-substituted or substituted aryl group having 6 to 20 carbon atoms, or a non-substituted or substituted alkyl group having 1 to 20 carbon atoms.

In the catalyst of the present invention for preparation of a polyester, in the reaction product of the titanium compound component (A) and the phosphorus compound component (B), a reaction molar ratio ($m_{Ti}/m_P$) of a molar amount ($m_{Ti}$), in terms of titanium atoms, of the titanium compound component (A) to a molar amount ($m_P$), in terms of phosphorus atoms, of the phosphorus compound component (B) is preferably within a range from 1:1 to 1:3.

In the catalyst of the present invention for preparation of a polyester, the titanium compounds (1) of the formula (I) are preferably selected from titanium tetraalkoxides, octaalkyl trititanates and hexaalkyl dititanates.

In the catalyst of the present invention for preparation of a polyester, the aromatic polycarboxylic acids of the formula (II) and the anhydride thereof are preferably selected from phthalic acid, trimellitic acid, hemimellitic acid and pyromellitic acid are anhydrides thereof.

In the catalyst of the present invention for preparation of a polyester, the titanium compounds (2) are preferably reaction products of the titanium compounds (1) of the formula (I) with the aromatic polycarboxylic acids of the formula (II) or the anhydride thereof at a reaction molar ratio of 2:1 to 2:5.

In the catalyst of the present invention for preparation of a polyester, the phosphorus compounds (3) of the formula (III) are preferably selected from monomethyl phosphate, monoethyl phosphate, monotrimethyl phosphate, mono-n-butyl phosphate, monohexyl phosphate, monoheptyl phosphate, monooctyl phosphate, monononyl phosphate, monodecyl phosphate, monododecyl phosphate, monolauryl phosphate, monooleyl phosphate, monotetradecyl phosphate, monophenyl phosphate, monobenzyl phosphate, mono(4-dodecyl) phenyl phosphate, mono(4-methylphenyl) phosphate, mono (4-ethylphenyl) phosphate, mono(4-propylphenyl) phosphate, mono(4-dodecylphenyl) phosphate, monotolyl phosphate, monoxylyl phosphate, monobiphenyl phosphate, mononaphthyl phosphate and monoanthryl phosphate.

In the catalyst of the present invention for preparation of a polyester, the reaction product is preferably one obtained by a reaction of the titanium compound component (A) comprising at least one member of the titanium compounds of the formula (I) (in which k represents 1) with the phosphorus compound component (B) comprising at least one member of the phosphorus compounds (3) of the formula (III).

In the catalyst of the present invention for preparation of a polyester, the reaction product of the titanium compound component (A) comprising at least one member of the titanium compounds of the formula (I) (in which k represents 1) and the phosphorus compound component (B) comprising at least one member of the phosphorus compounds (3) of the formula (III) preferably includes a compound represented by the formula (IV):

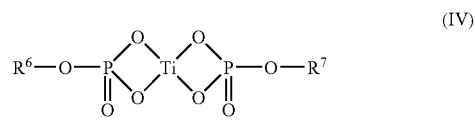 (IV)

in which formula (IV), $R^6$ and $R^7$ respectively and independently from each other represents an alkyl group having 2 to 10 carbon atoms or an aryl group having 6 to 12 carbon atoms.

In the catalyst of the present invention for preparation of a polyester, the reaction product of the titanium compound component (A) and the phosphorus compound component (B) is produced at a reaction temperature of 50 to 200° C.

The process of the present invention for preparing a polyester comprises subjecting a polymerization starting material comprising at least one member selected from esters of aromatic dicarboxylic acids with alkylene glycols and low polymerization degree polymers of the esters to the polycondensation reaction in the presence of the catalyst of the present invention for preparation of the polyester.

In the process of the present invention for preparing a polyester, the titanium atoms contained in the catalyst are preferably in an amount, in millimoles, of 2 to 40% based on the total amount, in millimoles, of the aromatic dicarboxylic acid component contained in the polymerization starting material.

In the process of the present invention for preparing a polyester, the aromatic dicarboxylic acid is preferably selected from terephthalic acid, isophthalic acid, naphthalenedicarboxylic acid, diphenyldicarboxylic acid, diphenylsulfonedicarboxylic acid, diphenylmethanedicarboxylic acid, diphenyl ether dicarboxylic acid, diphenoxyethanedicarboxylic acid and β-hydroxyethoxybenzoic acid.

In the process of the present invention for preparing a polyester, the terephthalic acid may be obtained by depolymerizing a polyalkylene terephthalate and hydrolyzing the resulting dimethyl terephthalate.

In the process of the present invention for preparing a polyester, the esters of the aromatic dicarboxylic acids with the alkylene glycols may be esters of terephthalic acid with an alkylene glycols and may be obtained by depolymerizing polyalkylene terephthalates and transesterifying the resulting dimethyl terephthalate with the alkylene glycol.

In the process of the present invention for preparing a polyester, the polyalkylene terephthalate to be depolymerized may be a discarded polyalkylene terephthalate molded articles and/or polymer scraps recovered in the manufacturing process of the polyalkylene terephthalates.

In the process of the present invention for preparing a polyester, the alkylene glycols are preferably selected from ethylene glycol, trimethylene glycol, tetramethylene glycol, neopentyl glycol and hexamethylene glycol.

In the process of the present invention for preparing a polyester, the polycondensation reaction is preferably conducted at a temperature of 230 to 320° C.

The polyester of the present invention is prepared by the process of the present invention.

In the polyester prepared by the process of the present invention, the content of cyclic trimers of esters of the aromatic dicarboxylic acids with the alkylene glycols and having an intrinsic viscosity of 0.70 to 0.90 is preferably 0.50% by mass or less and the content of acetaldehyde is preferably 5 ppm or less.

In the polyester prepared by the process of the present invention, an antioxidant comprising at least one hindered phenol compound preferably further comprises an amount of 1% by mass or less based on the amount in mass of the polyester.

The polyester prepared by the process of the present invention is suited for the preparation of a molded article.

The molded article of the polyester prepared by the process of the present invention includes bottle-shaped articles, sheet-shaped articles, formed containers and injection molded articles.

The molded article of the present invention includes a polyester fiber obtained by melting a resin material comprising the polyester prepared by the process of the present invention, extruding the melt into a filamentary form and solidifying the extruded filamentary melt.

The molded article includes a polyester film obtained by melting a resin material comprising the polyester prepared by the process of the present invention, extruding the melt into a sheet form, solidifying the sheet formed melt and drawing the resulting undrawn film in biaxial directions.

BEST MODE FOR CARRYING OUT THE INVENTION

The catalyst for preparation of a polyester of the present invention comprises a reaction product of a titanium compound component (A) and a phosphorus compound component (B), which will be described in detail below.

The titanium compound component (A) used in the catalyst of the present invention comprises at least one member selected from:

titanium compounds (1) represented by the general formula (I) and titanium compounds (2) obtained by reacting the titanium compounds (1) of the general formula (I) with aromatic polycarboxylic acids represented by the general formula (II).

In the formula (I), $R^1$, $R^2$, $R^3$ and $R^4$ respectively and independently from each other represent an alkyl group having 2 to 10 carbon atoms, preferably 2 to 6 carbon atoms, k represents an integer of 1 to 3 and, when k is 2 or 3, two or three $R^2$ and $R^3$ substituents may be the same as or different from each other.

In the formula (II), m represents an integer of 2 to 4, preferably 2 or 3.

The phosphorus compound component (B) used in the catalyst of the present invention comprises at least one member of phosphorus compounds (3) represented by the general formula (III).

In the formula (III), $R^5$ represents a non-substituted or substituted aryl group having 6 to 20 carbon atoms, preferably 6 to 12 carbon atoms, or an alkyl group having 1 to 20 carbon atoms, preferably 1 to 12 carbon atoms.

In the reaction product of the titanium compound component (A) and the phosphorus compound component (B) used in the catalyst for preparation of a polyester of the present invention, a reaction molar ratio $m_{Ti}/m_P$ of a molar amount ($m_{Ti}$), in terms of titanium atoms, of the titanium compound component (A) to a molar amount ($m_P$), in terms of phosphorus atoms, of the phosphorus compound component (B) is preferably within a range from 1:1 to 1:3, more preferably from 1:1 to 1:2.

The molar amount ($m_{Ti}$), in terms of titanium atoms, of the titanium compound component (A) is a total value of products of molar amounts of the individual titanium compounds contained in the titanium compound component (A) and the number of titanium atoms contained in a molecule of the individual titanium compounds. The molar amount, in terms of phosphorus atoms of the phosphorus compound component (B) is a total value of products of molar amounts of the individual phosphorus compounds contained in the phosphorus compound component (B) and the number of phosphorus atoms contained in a molecule of the individual phosphorus compounds. The phosphorus compounds of the formula (III) contain a phosphorus atom per molecule, and therefore, the molar amount in terms of phosphorus atoms of the individual phosphorus compounds is equal to the molar amount of the phosphorus compounds.

When the reaction molar ratio $m_{Ti}/m_P$ is larger than 1:1, that is, when the amount of the titanium compound component (A) becomes too large, the polyester obtained by using the resulting catalyst may exhibit poor color tone (b value becomes too large) and the heat resistance may be reduced. On the other hand, when the reaction molar ratio $m_{Ti}/m_P$ is smaller than 1:3, that is, when the amount of the titanium compound component (A) becomes too small, the catalytic activity of the resulting catalyst to the polyester production reaction may be insufficient.

The titanium compounds (1) of the formula (I) usable for the titanium compound component (A) include titanium tetraalkoxides, for example, titanium tetrabutoxide, titanium tetraisopropoxide, titanium tetrapropoxide and titanium tetraethoxide; and alkyl titanates, for example, octaalkyl tritianates and hexaalkyl dititanates. Among these titanium compounds, titanium tetraalkoxides, which have good reactivity with the phosphorus compound component used in the present invention, are preferably used, and titanium tetrabutoxide is used even more preferably.

The titanium compounds (2) usable for the titanium compound component (A) are obtained by reacting titanium compounds (1) of the general formula (I) with aromatic polycarboxylic acids of the general formula (II) or an anhydride thereof. The aromatic polycarboxylic acids of the general formula (II) and the anhydrides thereof are preferably selected from phthalic acid, trimellitic acid, hemimellitic acid and pyromellitic acid and anhydrides thereof. It is more preferred to use trimellitic anhydride, which has good reactivity to the titanium compounds (1), and the resultant polycondensation catalyst has a high affinity with the polyesters.

The reaction between a titanium compound (1) and an aromatic polycarboxylic acids of the general formula (II) or an anhydride thereof is conducted by mixing the aromatic polycarboxylic acid or the anhydride thereof with a solvent to dissolve a portion or all of the mixture in the solvent, adding dropwise a titanium compound (1) to the mixed solution, and heating the mixture at a temperature within a range from 0 to 200° C. for 30 minutes or more, preferably at a temperature within a range from 30 to 150° C. for 40 to 90 minutes. The reaction pressure during the reaction is not specifically limited and may be the ambient atmospheric pressure. The solvent may be selected appropriately from those capable of dissolving a portion or all of a necessary amount of a compound of the formula (II) or an anhydride thereof, and is preferably selected from ethanol, ethylene glycol, trimethylene glycol, tetramethylene glycol, benzene and xylene.

The reaction molar ratio of the titanium compound (1) to the aromatic polycarboxylic acid of the formula (II) or the anhydride thereof is not specifically limited. However, when the proportion of the titanium compound (1) is too high, the resulting polyester may exhibit poor color tone and the softening point may be lowered. On the other hand, when the proportion of the titanium compound (1) is too low, the polycondensation reaction may hardly proceed. Therefore, the reaction molar ratio of the titanium compound (1) to the compound of the formula (II) or the anhydride thereof is preferably controlled within a range from 2/1 to 2/5. The reaction product obtained by this reaction may be directly subjected to the reaction with a phosphorus compound (3). Alternatively, the reaction product may be reacted with the phosphorus compound (3) after purifying the reaction product by recrystallization thereof in a solvent such as acetone, methyl alcohol and/or ethyl acetate.

In the phosphorus compounds (3) of the general formula (III) used in the phosphorus compound component (B), a $C_6$-$C_{20}$ aryl group or a $C_1$-$C_{20}$ alkyl group represented by $R^5$ may be non-substituted or substituted with one or more substituents. The substituents include a carboxyl group, an alkyl group, a hydroxyl group, and an amino group.

The phosphorus compound (3) of the formula (III) includes, for example, monoalkyl phosphates and monoaryl phosphates such as monomethyl phosphate, monoethyl phosphate, monotrimethyl phosphate, mono-n-butyl phosphate, monohexyl phosphate, monoheptyl phosphate, monooctyl phosphate, monononyl phosphate, monodecyl phosphate, monododecyl phosphate, monolauryl phosphate, monooleyl phosphate, monotetradecyl phosphate, monophenyl phosphate, monobenzyl phosphate, mono(4-dodecyl)phenyl phosphate, mono(4-methylphenyl) phosphate, mono(4-ethylphenyl) phosphate, mono(4-propylphenyl) phosphate, mono(4-dodecylphenyl) phosphate, monotolyl phosphate, monoxylyl phosphate, monobiphenyl phosphate, mononaphthyl phosphate and monoanthryl phosphate. These phosphorus compounds may be used alone or used as a mixture of two or more of them, for example, a mixture of a monoalkyl phosphate with a monoaryl phosphate. When using the phosphorus compounds are used in a mixture of two or more members of them, the monoalkyl phosphate is preferably used in a proportion of 50% or more, more preferably 90% or more, particularly preferably 100%, of the mixture.

The catalyst is prepared from the titanium compound component (A) and the phosphorus compound component (B), for example, by mixing the component (B) comprising at least one member of the phosphorus compounds (3) of the formula (II) with a solvent, to dissolve a portion or all of the phosphorus compound component (B) in the solvent, adding dropwise the titanium compound component (A) to the mixed solution, and heating the resultant reaction system at a temperature within a range from 50 to 200° C., preferably from 70 to 150° C., for one minute to 4 hours, preferably 30 minutes to 2 hours. The reaction pressure during the reaction is not specifically limited and may be an elevated pressure (0.1 to 0.5 MPa), the ambient atmospheric pressure or reduced pressure (0.001 to 0.1 MPa), and the reaction is usually conducted at the ambient atmospheric pressure.

The solvent for the phosphorus compound component (B) of the formula (III) used in the reaction for preparation of the catalyst is not specifically limited as far as it can dissolve at least a portion of the phosphorus compound component (B) and, for example, a solvent comprising at least one member selected from ethanol, ethylene glycol, trimethylene glycol, tetramethylene glycol, benzene and xylene is preferably used. It is particularly preferred to use, as the solvent, the same compound as that of the glycol component from which the polyester is finally prepared.

In the reaction for preparation of the catalyst, a ratio of the titanium compound component (A) to the phosphorus compound component (B) in the reaction system is established so that in the reaction product of the titanium compound component (A) and the phosphorus compound component (B), contained in the resultant catalyst, a reaction molar ratio $m_{Ti}/m_P$ of a molar amount ($m_{Ti}$), in terms of titanium atoms, of the titanium compound component (A) to a molar amount ($m_P$) in terms of phosphorus atoms, of the phosphorus compound component (B) is preferably within a range from 1:1 to 1:3, and more preferably from 1:1 to 1:2.

The reaction product of the titanium compound component (A) with the phosphorus compound component (B) may be used as the catalyst for preparation of a polyester after being separated from the reaction system by a means such as centrifugal sedimentation treatment or filtration and before refining. Alternatively, the separated reaction product may be refined by recrystallization from a recrystallizer such as acetone, methyl alcohol and/or water and then the resultant refined product may be used as the catalyst. Also, the reaction product-containing reaction mixture may be directly used as a catalyst-containing mixture without separating the reaction product from the reaction system.

In an embodiment of the catalyst of the present invention for preparation of a polyester, a reaction product of the titanium compound component (A) comprising of at least one member of the titanium compounds (1) of the formula (I) (in which k represents 1) with the phosphorus compound component (B) comprising at least one member of the phosphorus compound of the formula (III) is used as the catalyst.

In this catalyst, the reaction product of the titanium compound component comprising at least one member of the titanium compounds of the formula (I) (in which k represents 1) and the phosphorus compound component (B) comprising of at least one kind of the phosphorus compound of the formula (III) includes a compound represented by the above-mentioned formula (IV). In this case, $R^6$ and $R^7$ in the formula (IV), respectively and independently from each other represent an alkyl group having 2 to 10 carbon atoms, which is derived from any one of $R^1$, $R^2$, $R^3$ and $R^4$ of the titanium compound (1), or an aryl group having 6 to 12 carbon atoms, which is derived from the substituent $R^5$ of the phosphorus compound (3). The catalyst containing the titanium/phosphorus compound represented by the formula (IV) has a high catalytic activity and the polyester prepared by using the same has a good color tone (low b value) and the contents of acetaldehyde, residual metal and a cyclic trimer of an ester of the aromatic dicarboxylic acid and alkylene glycol are sufficiently low for practice, and also has practically satisfactory polymer performances.

In the catalyst of the present invention for preparation of a polyester, the titanium/phosphorus compound represented by the formula (IV) is preferably contained in a proportion of 50% by mass or more, and more preferably 70% by mass or more.

In the process for preparing a polyester of the present invention, a polymerization starting material comprising at least one member selected from alkylene glycol esters of aromatic dicarboxylic acids and low polymerization degree polymers (oligomer) thereof is polycondensed in the presence of the catalyst described above. The amount in millimoles in terms of titanium atoms of the catalyst to be used is preferably established so that it corresponds to 2 to 40%, more preferably 5 to 35%, and still more preferably 10 to 30%, of the total amount in millimoles of the aromatic dicarboxylic acid component contained in the polymerization starting material. When the catalyst amount is less than 2%, the reaction-promoting effect of the catalyst on the polycondensation reaction of the polymerization starting material may become insufficient and the preparation efficiency of the polyester may become insufficient and, furthermore, a polyester having a desired polymerization degree may not be obtained. On the other hand, when the catalyst amount exceeds 40%, the resulting polyester may exhibit an unsatisfactory color tone (b value) and a yellowish color, and the practicability of the polyester may decrease.

In the process for preparing a polyester of the present invention, the aromatic dicarboxylic acid for the alkylene glycol ester of the aromatic dicarboxylic acid used as the polymerization starting material, is preferably selected from terephthalic acid, isophthalic acid, naphthalenedicarboxylic acid, diphenyldicarboxylic acid, diphenylsulfonedicarboxylic acid, diphenylmethanedicarboxylic acid, diphenyl ether dicarboxylic acid, diphenoxyethanedicarboxylic acid and β-hydroxyethoxybenzoic acid. Particularly, terephthalic acid, isophthalic acid and naphthalenedicarboxylic acid are used more preferably. The alkylene glycol is preferably selected from ethylene glycol, trimethylene glycol, tetramethylene glycol, neopentyl glycol and hexamethylene glycol.

Although the process for preparing the alkylene glycol ester of the aromatic dicarboxylic acid and/or the low polymerization degree polymer thereof is not specifically limited, they are usually prepared by subjecting an aromatic dicarboxylic acid or an ester-forming derivative thereof and an alkylene glycol or an ester-forming derivative thereof to the heat reaction procedure.

For example, an ethylene glycol ester of terephthalic acid and/or a low polymerization degree polymer thereof used as the material of polyethylene terephthalate are prepared by a process of directly esterifying terephthalic acid with ethylene glycol, a process of transesterifying a lower alkyl ester of terephthalic acid with ethylene glycol, or a process of addition-reacting ethylene oxide to terephthalic acid.

Also a trimethylene glycol ester of terephthalic acid and/or a low polymerization degree polymer thereof usable as a material of polytrimethylene terephthalate can be prepared by a process of directly esterifying terephthalic acid with trimethylene glycol, a process of transesterifying a lower alkyl ester of terephthalic acid with trimethylene glycol, or a process of addition-reacting trimethylene oxide to terephthalic acid.

The alkylene glycol ester of the aromatic dicarboxylic acid and/or the low polymerization degree polymer of the ester may contain, as an additional component, another dicarboxylate ester copolymerizable with them in an amount in which the effect of the process of the present invention is not substantially impaired, for example, of 10 mol % or less, preferably 5 mol % or less, based on the total molar amount of the acid component.

The copolymerizable additional component is preferably selected from esters of acid components comprising at least one member selected from, for example, aliphatic and alicyclic dicarboxylic acids for example, adipic acid, sebacic acid and 1,4-cyclohexanecarboxylic acid, and hydroxycarboxylic acids, for example, β-hydroxybenzoic acid or p-oxybenzoic acid; with a glycol component comprising at least one member selected from, for example, aliphatic, cycloaliphatic and aromatic diol compounds, for example, alkylene glycol having two or more constituent carbon atoms, 1,4-cyclohexanedimethanol, neopentyl glycol, bisphenol A and bisphenol S and polyoxyalkylene glycols and anhydrides of the esters. The above mentioned esters for the additional component may be used alone, or in a mixture of two or more of the esters. The amount of the additional component is preferably used in a copolymerization amount within the above range.

When teraphthalic acid and/or dimethyl terephthalate is used as the starting material, recovered dimethyl terephthalate obtained by depolymerizing a polyalkylene terephthalate or recovered terephthalic acid obtained by depolymerizing the above-mentioned recovered dimethyl terephthalate can be used in the amount of 70% by mass based on the mass of the total acid component from which the polyester is constituted. In this case, the target polyalkylene terephthalate is preferably polyethylene terephthalate. It is particularly preferred to use, as the material source for preparation of a polyester, recovered PET bottles, recovered filter products, recovered polyester film products and polymer scraps generated in the manufacturing process of these products in view of effective utilization of resources.

The process of depolymerizing the recovered polyalkylene terephthalate to obtain dimethyl terephthalate is not specifically limited and any conventionally known process can be employed. For example, a polyester can be obtained by depolymerizing the recovered polyalkylene terephthalate by using ethylene glycol, subjecting the depolymerization product to a transesterification reaction with a lower alcohol, for example, methanol, refining the reaction mixture, thereby to recover a lower alkyl ester of terephthalic acid, subjecting the lower alkyl ester to a transesterification reaction with an alkylene glycol, and polycondensing the resulting phthalic acid/alkylene glycol ester. Also, the process of recovering terephthalic acid from the recovered dimethyl terephthalate is not specifically limited and any conventional process may be used. For example, terephthalic acid can be recovered by recovering dimethyl terephthalate from the reaction mixture obtained by the transesterification reaction by using a recrystallization method and/or a distillation method, and heat-hydrolyzing dimethyl terephthalate with water at a high temperature under a high pressure. In impurities contained in terephthalic acid obtained by the above-mentioned process, the total content of 4-carboxybenzaldehyde, paratoluic acid, benzoic acid and dimethyl hydroxyterephthalate is preferably 1 ppm or less. Also the content of monomethyl terephthalate is preferably within a range from 1 to 5000 ppm. The polyester can be prepared by directly esterifying terephthalic acid recovered by the above-mentioned process with an alkylene glycol and polycondensing the resultant ester.

In the process for preparing a polyester of the present invention, a catalyst may be added to the polymerization starting material at any stage before the beginning of the polycondensation reaction of the aromatic dicarboxylic acid alkylene glycol ester and/or the low polymerization polymer thereof, and also there is no limitation to the manner of adding the catalyst. For example, after preparing the aromatic dicarboxylic acid alkylene glycol ester, a solution or slurry of the catalyst may be added to the reaction system, thereby to initiate the polycondensation reaction. Alternatively, the solution or slurry of the catalyst may be added to the reaction system, together with the starting material for the preparation of the alkylene glycol ester of aromatic dicarboxylic acid, or after charging the starting material.

There is no specific limitation to the reaction conditions for preparation of a polyester in the process of the present invention. In general, the polycondensation reaction is preferably conducted at a temperature within a range from 230 to 320° C. under the ambient atmospheric pressure or reduced pressure (0.1 Pa to 0.1 MPa) or under a combination of the above-mentioned conditions, for 15 to 300 minutes.

In the process of the present invention, optionally, a reaction stabilizer, for example, trimethyl phosphate, is added to the reaction system at any stage of the preparation of a polyester. Also, optionally, one or more members selected from antioxidants, ultraviolet absorbers, flame retardants, fluorescent brightening agents, delustering agents, color tone-regulating agents, defoamers and other additives are mixed. Particularly, the polyester preferably contains at least one member of an antioxidant containing a hindered phenol compound is preferably contained in a content of 1% by mass or less in the polyester. When the content of the additives exceeds 1% by mass, there sometimes arises a problem that the quality of the resulting product is lowered by thermal deterioration of the antioxidant itself. The hindered phenol compound for antioxidant used in the polyester of the present invention can be selected from pentaerythritol-tetrakis[3-(3,5-di-tert-butyl-4-hydroxyphenyl)propionate], 3,9-bis{2-[3-(3-tert-butyl-4-hydroxy-5-methylphenyl)propionyloxy]-1,1-dimethylethyl}-2,4,8,10-tetraoxaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, 1,3,5-tris(4-tert-butyl-3-hydroxy-2,6-dimethylbenzene)isophthalic acid, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], 2,2-thio-diethylene-bis[3-(3,5-di-tert-butyl-4-hydroxyphenyl)propionate] and octadecyl-[3-(3,5-di-tert-butyl-4-hydroxyphenyl)propionate]. These hindered phenol-based antioxidants and thioether-based secondary antioxidants may be preferably used as a combination thereof.

Although the manner of adding the above-mentioned hindered phenol-based antioxidant to the reaction mixture is not specifically limited, it is preferably added at any stage of the process after the completion of the transesterification reaction or the esterification reaction, and before the polymerization reaction is completed.

To finely regulate the color tone of the resultant polyester, color tone-regulating agents comprising at least one member selected from organic blue pigments, for example, azo-, triphenylmethane-, quinoline-, anthraquinone- and phthalocyanine-based pigments and inorganic blue pigments can be added to the reaction system during the preparation procedure of the polyester. In the process of the present invention, it is not necessary to use, as the color tone-regulating agent, an inorganic blue pigment containing, for example, cobalt which causes the melt thermal stability of the polyester to decrease, as a matter of course. Therefore, the polyester obtained by the process of the present invention is substantially free from cobalt.

In the polyester obtained by the process of the present invention, the L value as measured by a Hunter's color-difference calorimeter is usually 80.0 or more and the b value is usually within a range from −2.0 to 5.0. When the L value of the polyester is less than 80.0, as the whiteness of the resultant polyester is too low, it is sometime impossible to obtain a high whiteness molded article which can be put into use. When the b value is less than −2.0, the resultant polyester exhibits a low yellowish color tone but a bluish color tone increases. On the other hand, when the b value exceeds 5.0, since the yellowish color tone of the resulting polyester increases, the polyester may not be used to prepare a practicably useful molded article. The L value of the polyester obtained by the process of the present invention is preferably 82 or more, and particularly preferably 83 or more, while the b value is preferably within a range from −1.0 to 4.5, and particularly preferably from 0.0 to 4.0.

The L value and the b value of the polyester obtained by the process of the present invention are measured in the following manner. Namely, a sample of the polyester is melted at 290° C. under vacuum for 10 minutes and is formed, on an aluminum plate, into a plate form having a thickness of 3.0±1.0 mm. The resultant plate-shaped polyester test piece is immediately quenched in iced water, dried at 160° C. for one hour and then subjected to a crystallization treatment. The resultant plate-shaped polyester test piece is placed on a white standard plate for regulating a color-difference meter and, then, the color tone of the surface of the plate-shaped polyester test piece on the standard plate is measured by a color-difference calorimeter, for example, Hunter's color-difference meter CR-200 manufactured by Minolta Co., Ltd.

The intrinsic viscosity of the polyester in the present invention is not specifically limited, but is preferably within a range from 0.55 to 1.0. When the intrinsic viscosity is within this range, the melt-shaping procedure is easily conducted and the shaped article obtained by the melt shaping process has a high mechanical strength. The intrinsic viscosity is more preferably within a range from 0.60 to 0.90, and particularly preferably from 0.62 to 0.80.

The intrinsic viscosity of the polyester is measured at a temperature of 35° C. after dissolving the polyester to be tested in ortho-chlorophenol.

The polyester obtained by the solid phase polycondensation is often employed in general-purpose bottles and, therefore, the polyester preferably has an intrinsic viscosity within a range from 0.70 to 0.90, a content of a cyclic trimer of an ester of the aromatic dicarboxylic acid with the alkylene glycol of 0.5% by mass or less, and a content of acetaldehyde of 5 ppm or less. The esters from which the cyclic trimer is formed include alkylene terephthalates, for example, ethylene terephthalate, trimethylene terephthalate or hexamethylene terephthalate; and alkylene naphthalates, for example, ethylene naphthalate, trimethylene naphthalate or hexamethylene naphthalate.

EXAMPLES

The present invention will be explained in detail by the following examples, but the scope of the present invention is not limited by these examples. In the examples, the following measurements were conducted.

(1) Intrinsic Viscosity (IV)

An intrinsic viscosity (IV) of a polyester polymer was determined from values of the viscosity measured at 35° C. in an orthochlorophenol solution of a polyester sample.

(2) Color Tone (L Value and b Value)

A polyester sample was melted at 290° C. under vacuum for 10 minutes and was formed, on an aluminum plate, into a plate form having a thickness of 3.0±1.0 mm. The resultant plate-shaped polyester test piece was immediately quenched in iced water, dried at 160° C. for one hour and then subjected to a crystallization treatment. The resultant plate-shaped polyester test piece was placed on a white standard plate for regulating a color-difference meter and Hunter's L value and b value of the surface of the plate-shaped polyester test piece was measured by a Hunter's color-difference meter CR-200 manufactured by Minolta Co., Ltd. The L value means the lightness and shows that the lightness of the test piece increases as the numerical value increases, while the b value represents a yellowness and shows that the yellowness of the test piece increases as the b value increases.

(3) Color Tone (L Value and b Value) of Film

A test piece was made by laminating five biaxially oriented polyester films on each other and the resulting test piece was crystallized by a heat treatment in a dryer maintained at 160° C. for 90 minutes, and then the color tone of the test piece was measured by using a color machine (model CM-7500 manufactured by Color Machine Co., Ltd.).

(4) Metal Concentration Analysis

In the measurement of concentrations of titanium and phosphorus atoms in the catalyst in the examples prepared, a dried catalyst sample was mounted in a scanning electron microscope (Model S570, manufactured by Hitachi Instruments Service Co., Ltd.) and the concentration of titanium and phosphorus atoms in the catalyst was determined by using an energy dispersive X-ray microanalyzer (XMA, Model EMAX-7000, manufactured by Horiba Seisakusho, K.K.) connected to the scanning electron microscope.

In the measurement of the concentration of a residual catalytic metals in the polyester, granular polyester samples were heat-melted on an aluminum plate and a molded specimen having a flat surface was made by a compression press, and then the concentration of the metals in the molded specimen was determined by using a fluorescent X-ray analysis apparatus, Model 3270E, manufactured by Rigaku Denki Kogyo K.K.

(5) Tensile Strength and Ultimate Elongation of Fibers

The tensile strength and ultimate elongation of fibers were measured in accordance with the procedure described in JIS L1013.

(6) Haze (Bottle Body Portion)

After the beginning of injection molding of a preform for formation of a bottle, any one piece obtained after 5 shots was taken as a sample and sampling was conducted at a center portion in a longitudinal direction of the body portion of a preform molded piece. The haze of this sample was measured by using a turbidity meter, Model HD-1001DP, manufactured by Nippon Denshoku K. K.

(7) Haze (Undrawn Film)

An undrawn film (sheet) having a thickness of 500 μm was made by drying granular polymer samples with heat treatment in a dryer at 150° C. for 6 hours, melt-extruding through a melt extruder at 290° C. into a sheet on a rotary cooling drum, and solidifying the sheet with quenching. Sampling was conducted at the position free from scratches on the surface of the resulting undrawn sheet and the haze of the sample was measured by using a turbidity meter, Model HD-1001DP, manufactured by Nippon Denshoku K. K.

(8) Content of acetaldehyde

A polyester sample was freeze-dried, charged in a vial and left to stand at a temperature of 150° C. for 60 minutes, and then the content of acetaldehyde in the sample was measured by a head-space gas chromatograph manufactured by Hitachi, Ltd.

(9) Cyclic Trimer Amount

A polyester sample was ground in a grinder and a fixed amount of a ground sample was weighed and dissolved in a small amount of a hexafluoroisopropanone/chloroform mixed solution, and then this solution was diluted with chloroform to give a sample solution having a fixed concentration (50 g/liter). This sample solution was subjected to gel permeation chromatography (GPC, Model ALC/GPC244, manufactured by Waters Co.) and a low-molecular weight fraction was separated and the peak was detected. The content of a cyclic trimer in the sample was determined by using, as a standard, a calibration curve determined from a standard sample of the cyclic trimer.

(10) Thermal Stability of Film

The value (A) of the intrinsic viscosity of a biaxially oriented film and the value (B) of the intrinsic viscosity of granular polymers used to form the biaxially oriented film were measured, and then a value ((B)–(A)) was calculated.

The sample having the value ((B)–(A)) within the range from 0 to 0.05 is particularly superior in thermal stability, while the sample having the value ((B)–(A)) within a range from 0.05 to 0.1 is slightly inferior in thermal stability and the sample having the value ((B)–(A)) of more than 0.1 is inferior in thermal stability.

(11) Layer of Deposit Formed on Spinning Spinneret

After a polyester sample was formed into chips, the resultant chips were melted at 290° C. and the melt was melt-spun by extruding through a spinning spinneret with 12 holes having a hole diameter of 0.15 mm at a extrusion rate of 600 m/min., for 2 days. The height of the layer of a deposit formed on an outer periphery of the extrusion hole of the spinneret was measured. The larger the height of the layer of the deposit, the more a bending phenomenon of a filament-shaped stream of the extruded polyester melt occurs easily, resulting in decreased formability of the polyester. That is, the height of the layer of the deposit formed on the spinning spinneret is an index of the formability of the polyester.

Example 1

Preparation of Titanium Compound:

In a 2 liter three-necked flask equipped with a means for mixing the contents under stirring, 919 g of ethylene glycol and 10 g of acetic acid were charged and the mixture was stirred, and then 71 g of titanium tetrabutoxide was gradually added to the mixture to prepare a transparent solution of the titanium compound in ethylene glycol. Hereinafter, this solution will be referred to as a "TB solution". The titanium concentration of this solution was measured by using fluorescence X-ray. As a result, it was 1.02%.

Preparation of Phosphorus Compound:

In a 2 liter three-necked flask equipped with a means for mixing contents under stirring with heating, 656 g of ethylene glycol was charged, followed by heating to 100° C. with stirring. Upon arrival at the temperature, 34.5 g of monolauryl phosphate was added and the mixture was dissolved by heating with stirring to obtain a transparent solution. Hereinafter, this solution will be referred to as a "P1 solution".

Preparation of Catalyst:

The temperature of the P1 solution (about 690 g) was controlled to 100° C. with stirring and 310 g of the TB solution was gradually added and, after the completion of the addition, this reaction system was stirred at a temperature of 100° C. for one hour to complete the reaction between the titanium compound and the phosphorus compound. The mixing ratio of the P1 solution to the TB solution was controlled so that the molar ratio of phosphorus atoms to titanium atoms becomes 2.0. The resultant reaction product existed in the form of a fine deposit because the reaction product is insoluble in ethylene glycol, and thus the reaction mixture was in the state of white turbidity. Hereinafter, this catalyst dispersion will be referred to as a "TP1-2.0 catalyst".

To analyze the reaction deposit in the TP1-2.0 catalyst, a portion of the reaction deposit was used as a sample and the sample was filtered through a filter having a mesh opening size of 5 μm, thereby to collect the reaction deposit as a solid, the deposit was washed with water and dried. The resulting reaction deposit was subjected to analysis of the element concentration using an XMA analytical method. As a result, it contained 12.0% of titanium and 16.4% of phosphorus. The molar ratio of phosphorus atoms to titanium atoms was 2.1. Furthermore, the reaction deposit was subjected to solid NMR analysis. As a result, the following results were obtained. In the measurement of C13 CP/MAS (frequency: 75.5 Hz), disappearance of peaks at chemical shifts in 14 ppm, 20 ppm and 36 ppm derived from the butoxide structure of titanium tetrabutoxide was observed. In the measurement of P-31 DD/MAS frequency: 121.5 Hz), a new chemical shift peak 22 ppm, which has never been present in conventional monolauryl phosphate, was observed. It was clearly confirmed from these analytical results that the reaction deposit obtained in this example contains a new product obtained by the reaction between the titanium compound and the phosphorus compound.

Example 2

A Ti/P-containing catalyst was prepared in the same procedures as in Example 1, except that monobutyl phosphate was used in place of monolauryl phosphate and 28.3 g of monobutyl phosphate was dissolved in 537 g of ethylene glycol under heating (P2 solution) and then 435 g of the TB solution was added in this solution and the resultant mixture was subjected to the reaction. The mixing ratio of the P2 solution to the TB solution was controlled so that the molar ratio of phosphorus atoms to titanium atoms became 2.0. Hereinafter, the resultant reaction mixture liquid will be referred to as a "TP2-2.0 catalyst". The heating temperature for the reaction was 70° C. and the reaction time was one hour.

To analyze this reaction deposit, a sample of the resultant reaction solution was filtered through a filter having a mesh opening size of 5 μm, thereby to collect the reaction deposit as a solid, and the deposit was washed with water and dried. The analysis of the element concentration of the resultant reaction deposit was conducted in the same manner as in Example 1. As a result, it contained 17.0% of titanium and 21.2% of phosphorus. The molar ratio of phosphorus atoms to titanium atoms was 1.9.

Example 3

A catalyst was prepared in the same procedures as in Example 1, except that the composition of the TP1 solution and the additive amount of the TB solution were changed as follows. That is, 31.3 g of monolauryl phosphate was dissolved in 594 g of ethylene glycol with heating to prepare a P3 solution, and then 375 g of the TB solution was added to the solution and the reaction was conducted to prepare a reaction mixture liquid. The mixing ratio of the P3 solution to the TB solution was controlled so that the molar ratio of phosphorus atoms to titanium atoms becomes 1.5. Hereinafter, the resulting reaction mixture liquid will be referred to as a "TP3-1.5 catalyst".

Example 4

A catalyst was prepared in the same procedures as in Example 2, except that the composition of the TP2 solution and the additive amount of the TB solution were changed as follows. That is, 33.0 g of monobutyl phosphate was dissolved in 627 g of ethylene glycol with heating to prepare a P4 solution. Then, 340 g of the TB solution was added in the solution and the reaction was conducted to prepare a reaction mixture liquid. The mixing ratio of the P4 solution to the TB solution was controlled so that the molar ratio of phosphorus atoms to titanium atoms becomes 3.0. Hereinafter, the resulting reaction mixture liquid will be referred to as a "TP4-3.0 catalyst".

Example 5

In a reaction vessel in which 225 g of an ethylene glycol-terephthalic acid oligomer resided, a slurry prepared by mixing 179 g of high-purity terephthalic acid with 95 g of ethylene glycol under the conditions maintained at 255° C. under ambient atmospheric pressure was fed at a fixed rate in a nitrogen atmosphere while stirring the oligomer, and then both compounds were esterified over 4 hours by stirring the reaction mixture in the reaction vessel while removing water and ethylene glycol produced by the esterification reaction and the oligomerization reaction of both compounds from the reaction system, and thus the reaction was completed. The esterification degree was 98% or more and the polymerization degree of the ester oligomer thus obtained was within a range from about 5 to 7.

225 g of the ester oligomer obtained by this esterification reaction was charged in a polycondensation reaction vessel and 0.832 g of the titanium/phosphorus reaction compound (TP1-2.0) solution prepared in Example 1 was mixed as a polycondensation catalyst with the ester oligomer. While stirring this reaction system using a stirring wings, the reaction temperature was increased stepwise from 255 to 280° C. and, at the same time, the reaction pressure was reduced stepwise from the ambient atmospheric pressure to 60 Pa and the polycondensation reaction of the ester oligomer was conducted while removing water and ethylene glycol produced by the polycondensation reaction of the ester oligomer. The polycondensation reaction time was 110 minutes.

The proceeding degree of the polycondensation reaction was checked by monitoring a load applied to the stirring wings in the reaction system and the reaction was completed when the polymerization degree of the resulting polyester reaches a desired degree. The reaction mixture in the system was continuously extruded through an extruding portion of the reaction vessel into a strand form, then the extruded reaction mixture streams were solidified with cooling and then cut to prepare granular pellets having a granule size of about 3 mm. The intrinsic viscosity (IV) value of polyethylene terephthalate in the reaction mixture was 0.52 and the content of diethylene glycol (DEG) was 1.3% by mass. With respect to the color tone, the L value was 81 and the b value was 1.0. With respect to the catalytic metal concentrations, the titanium concentration was 13 ppm and the phosphorus concentration was 16 ppm. The DEG content was measured by decomposing a sample with hydrazine hydrate and subjecting the decomposition product to gas chromatography (Model "263-70", manufactured by Hitachi, Ltd.). The measuring results are shown in Table 1.

Example 6

In the same procedures as in Example 5, polyethylene terephthalate was prepared, except that the titanium/phosphorus reaction product (TP2-2.0) solution prepared in Example 2 was used as the polycondensation catalyst and the charge amount thereof was 0.593 g. The polycondensation reaction time was changed to 105 minutes. The IV value of polyethylene terephthalate in the reaction mixture was 0.52 and the content of diethylene glycol (DEG) was 1.3% by mass. With respect to the color tone, the L value was 81 and the b value was 0.8. With respect to the catalytic metal concentrations, the titanium concentration was 12 ppm and the phosphorus concentration was 15 ppm. The measuring results are shown in Table 1.

Example 7

In the same procedures as in Example 5, polyethylene terephthalate was prepared, except that the titanium/phosphorus reaction product (TP3-1.5) solution prepared in Example 3 was used as the polycondensation catalyst and the charge amount thereof was changed to 0.413 g. The polycondensation reaction time was changed to 115 minutes. In the resultant polyethylene terephthalate, the IV value was 0.52 and the DEG content was 1.2% by weight. With respect to the color tone, the L value was 81 and the b value was 1.8. With respect to the catalytic metal concentrations, the titanium concentration was 8 ppm and the phosphorus concentration was 7 ppm. The measuring results are shown in Table 1.

Example 8

In the same procedures as in Example 5, polyethylene terephthalate was prepared, except that the titanium/phosphorus reaction product (TP4-3.0) solution prepared in Example 4 was used as the polycondensation catalyst and the charge amount thereof was changed to 2.277 g. The polycondensation reaction time was changed to 120 minutes. In the resultant polyethylene terephthalate, the IV value was 0.52 and the DEG content was 1.3% by weight. With respect to the color tone, the L value was 81 and the b value was 0.7. With respect to the catalyst metal concentration, the titanium concentration was 38 ppm and the phosphorus concentration was 65 ppm.

Comparative Example 1

In the same procedures as in Example 5, polyethylene terephthalate was prepared, except that a 1.3% solution of antimony trioxide in ethylene glycol was used as a polycondensation catalyst and the charge amount thereof was 4.83 g and, furthermore, 0.121 g of a 25% solution of trimethyl phosphate in ethylene glycol, was added as a stabilizer, in the reaction mixture solution. The polycondensation reaction time was 110 minutes. In the resultant polyethylene terephthalate, the IV value was 0.52 and the DEG content was 1.0% by weight. With respect to the color tone, the L value was 78 and the b value was 3.5. With respect to the catalytic metal concentrations, the antimony concentration was 250 ppm and the phosphorus concentration was 26 ppm. The measuring results are shown in Table 1.

Comparative Example 2

In the same procedures as in Example 5, polyethylene terephthalate was prepared, except that the TB solution prepared in Example 1 was used as a polycondensation catalyst and the charge amount thereof was 0.258 g. The polycondensation reaction time was changed to 95 minutes. In the resultant polyethylene terephthalate, the IV value was 0.52 and the DEG content was 1.3% by weight. With respect to the color tone, the L value was 81 and the b value was 6.0. With respect to the catalytic metal concentration, the titanium concentration was 13 ppm. The measuring results are shown in Table 1.

Comparative Example 3

In the same procedures as in Example 5, polyethylene terephthalate was prepared, except that 0.258 g of the TB solution and 0.574 g of the P1 solution prepared in Example 1 were separately charged as a polycondensation catalyst, without reacting them with each other. The polycondensation reaction time was 110 minutes. In the resultant polyethylene terephthalate, the IV value was 0.52 and the DEG content was 1.3% by weight. With respect to the color tone, the L value was 81 and the b value was 3.5. With respect to the catalyst metal concentrations, the titanium concentration was 13 ppm and the phosphorus concentration was 14 ppm. The measuring results are shown in Table 1.

Comparative Example 4

In the same procedures as in Example 6, polyethylene terephthalate was prepared, except that 0.258 g of the TB solution prepared in Example 1 and 0.335 g of the P2 solution were separately charged, as the polycondensation catalyst, in the reaction system without reacting them with each other. The polycondensation reaction time was changed to 112 minutes. In the resultant polyethylene terephthalate, the IV value was 0.52 and the DEG content was 1.3% by weight. With respect to the color tone, the L value was 81 and the b value was 3.0. With respect to the catalytic metal concentrations, the titanium concentration was 13 ppm and the phosphorus concentration was 13 ppm. The measuring results are shown in Table 1.

Comparative Example 5

Preparation of Catalyst:
In the same procedures as in Example 1, a catalyst was prepared, except that di-n-butyl phosphate was used as the phosphorus compound in place of monolauryl phosphate. The amounts of the compounds as used and the reaction conditions were changed as follows.

38.6 g of trimethyl phosphate was dissolved in 537 g of ethylene glycol with heating (P5 solution) and 435 g of the TB solution was added to the solution and the reaction was conducted. The reaction temperature was 70° C. and the reaction time was one hour. The mixing ratio of the P2 solution to the TB solution was controlled so that the molar ratio of phosphorus atoms to titanium atoms becomes 2.0. Hereinafter, the resulting reaction mixture solution will be referred to as a "TP5-2.0 catalyst".

To analyze the reaction deposit in the reaction mixture, a sample of the resultant reaction solution was filtered through a filter having a mesh opening size of 5 μm, thereby to collect the reaction deposit as a solid, and the deposit was washed with water and dried. The analysis of the element concentrations of the resultant reaction deposit was conducted in the same manner as described above. As a result, the deposit contained 16.9% of titanium and 21.0% of phosphorus. The molar ratio of phosphorus atoms to titanium atoms was 1.9.

Preparation of Polyester:
In the same procedures as in Example 5, polyethylene terephthalate was prepared, except that 0.599 g of the TP5-2.0 catalyst solution prepared by the above operation was used as a polycondensation catalyst. The polycondensation reaction time was 100 minutes. In the resultant polyethylene terephthalate, the IV value was 0.52 and the DEG content was 1.3% by weight. With respect to the color tone, the L value was 78 and the b value was 5.4. With respect to the catalytic metal concentrations, the titanium concentration was 13 ppm and the phosphorus concentration was 16 ppm. The measuring results are shown in Table 1.

Comparative Example 6

Preparation of Catalyst:

In the same procedures as in Example 1, a catalyst was prepared, except that trimethyl phosphate was used as a phosphorus compound in place of monolauryl phosphate. The amounts of the compounds as used and the reaction conditions were changed as follows.

25.7 g of trimethyl phosphate was dissolved in 537 g of ethylene glycol with heating (P6 solution) and 435 g of the TB solution was added to the solution and the reaction was conducted at the heating temperature of 70° C. for a reaction time of one hour to obtain a reaction mixture. The mixing ratio of the P2 solution to the TB solution was controlled so that the molar ratio of phosphorus atoms to titanium atoms becomes 2.0. Hereinafter, the resulting reaction mixed solution will be referred to as a "TP6-2.0 catalyst".

To analyze the reaction deposit in the resultant TP6-2.0 catalyst, a sample of the resultant reaction solution was filtered through a filter having a mesh opening size of 5 μm, thereby to collect the reaction deposit as a solid, and the deposit was washed with water and dried. The analysis of the element concentration of the resulting reaction deposit was conducted in the same manner as described above. As a result, the deposit contained 16.0% of titanium and 20.9% of phosphorus. The molar ratio of phosphorus atoms to titanium atoms was 1.9.

Preparation of Polyester:

In the same procedures as in Example 5, polyethylene terephthalate was prepared, except that 0.591 g of the TP6-2.0 catalyst solution prepared by the above-mentioned procedures was used as a polycondensation catalyst. The polycondensation reaction time was 92 minutes. In the resultant polyethylene terephthalate, the IV value was 0.52 and the DEG content was 1.3% by weight. With respect to the color tone, the L value was 77 and the b value was 5.9. With respect to the catalytic metal concentrations, the titanium concentration was 13 ppm and the phosphorus concentration was 16 ppm. The measuring results are shown in Table 1.

As is apparent from Table 1, the titanium/phosphorus reaction product catalysts described in Examples 1 to 4 of the present invention are superior in polymerization reactivity as shown in Examples 5 to 8 and make it possible to prepare a polyester in an amount smaller than that of a conventional antimony compound catalyst, and also remarkably improve the color hue of the resulting polyester as compared with an antimony catalyst, or a catalyst system made of a simple mixture of a titanium compound and a phosphorus compound.

Example 9

Polyethylene terephthalate pellets prepared in the same procedures as in Example 5 and having an IV value of 0.64 were dried and melt-spun to produce an undrawn filament yarn of 333 dtex/36 filaments, and the undrawn yarn was drawn at a draw ratio of 4.0 to produce a drawn multifilament yarn of 83.25 dtex/36 filaments. The properties of the resulting polymer and that of the yarn are shown in Table 2.

Examples 10 to 12

In each of Examples 10 to 12, a polyethylene terephthalate yarn was produced in the same manner as in Example 9, except that polyethylene terephthalate pellets obtained in each of Examples 6 to 8 were used as polyethylene terephthalate pellets. The properties of the resultant polymers and of the yarns are shown in Table 2.

Comparative Examples 7 to 10

In each of Comparative Examples 7 to 10, a polyethylene terephthalate yarn was produced in the same manner as in Example 9, except that polyethylene terephthalate pellets obtained in each of Comparative Examples 1 to 4 were used as polyethylene terephthalate pellets. The properties of the resultant polymers and the yarns are shown in Table 2.

TABLE 1

| | Catalyst | | | Polymer quality | | | |
| | | Contents of catalytic components | | | Color | | |
| | Type of catalyst | Ti/P (ppm) | IV | DEG content (% by mass) | L value | b value | L − b value |
|---|---|---|---|---|---|---|---|
| Example 5 | TP1-2.0 | 13/16 | 0.52 | 1.3 | 81 | 1.0 | 80.0 |
| Example 6 | TP2-2.0 | 12/15 | 0.52 | 1.3 | 81 | 0.8 | 80.2 |
| Example 7 | TP3-1.5 | 8/7 | 0.52 | 1.2 | 81 | 1.8 | 79.2 |
| Example 8 | TP4-3.0 | 38/65 | 0.52 | 1.3 | 81 | 0.7 | 80.3 |
| Comparative Example 1 | $Sb_2O_3$ | 250(Sb) | 0.52 | 1.0 | 78 | 3.5 | 74.5 |
| Comparative Example 2 | TB solution | 13/— | 0.52 | 1.3 | 81 | 6.0 | 75.0 |
| Comparative Example 3 | TB + P1 solution | 13/14 | 0.52 | 1.3 | 81 | 3.5 | 77.5 |
| Comparative Example 4 | TB + P1 solution | 13/14 | 0.52 | 1.3 | 81 | 5.0 | 76.0 |
| Comparative Example 5 | TP5-2.0 | 13/16 | 0.52 | 1.3 | 78 | 5.4 | 72.6 |
| Comparative Example 6 | TP6-2.0 | 13/16 | 0.52 | 1.3 | 77 | 5.9 | 71.1 |

TABLE 2

| | Conditions for preparation of polymer | IV | DEG content (% by mass) | L value | b value | L − b value | Strength (cN/dtex) | Elongation (%) | Height of foreign matter deposited on spinneret (μm) |
|---|---|---|---|---|---|---|---|---|---|
| | | | | Polymer quality | | | | Yarn quality | |
| | | | | | Color | | | | |
| Example 9 | Example 5 | 0.64 | 1.3 | 81 | 1.0 | 80.0 | 3.8 | 25 | 4 |
| Example 10 | Example 6 | 0.64 | 1.3 | 81 | 0.8 | 80.2 | 3.7 | 23 | 5 |
| Example 11 | Example 7 | 0.64 | 1.2 | 81 | 1.8 | 79.2 | 3.7 | 22 | 4 |
| Example 12 | Example 8 | 0.64 | 1.3 | 81 | 0.7 | 80.3 | 3.8 | 23 | 7 |
| Comparative Example 7 | Comparative Example 1 | 0.64 | 1.0 | 78 | 3.5 | 74.5 | 3.7 | 24 | 32 |
| Comparative Example 8 | Comparative Example 2 | 0.64 | 1.3 | 81 | 6.0 | 75.0 | 3.8 | 24 | 9 |
| Comparative Example 9 | Comparative Example 3 | 0.64 | 1.3 | 81 | 3.5 | 77.5 | 3.6 | 25 | 9 |
| Comparative Example 10 | Comparative Example 4 | 0.64 | 1.3 | 81 | 5.0 | 76.0 | 3.5 | 26 | 9 |

Example 13

Polyethylene terephthalate pellets prepared in the same manner as in Example 5 and having an IV value of 0.64 were dried at 180° C. for 3 hours and fed in a single screw extruder (inner diameter: 65 mm, path length: 1000 mm, residence time: 10 minutes). After the temperature in the extruder was controlled to 280° C. in the vicinity of a charge port and controlled to 300° C. in the vicinity of a discharge port, the polymer was melted by gradually heating and then extruded through an extrusion die for film to form an undrawn film. This undrawn film was drawn at 90° C. in a longitudinal direction at a draw ratio of 3.5 (monoaxially drawn film), drawn in a lateral direction at a draw ratio of 4.0 (biaxially drawn film) and then thermally set at 200° C. to produce a biaxially drawn polyester film having a thickness of 15 μm. The properties of the resulting polymer and the film are shown in Table 3.

Examples 14 and 15

In each of Examples 14 to 15, a polyethylene terephthalate film was produced in the same manner as in Example 13, except that polyethylene terephthalate pellets obtained in each of Examples 6 and 7 were used as polyethylene terephthalate pellets. The properties of the resultant polymers and the films are shown in Table 3.

Comparative Examples 11 to 13

In each of Comparative Examples 11 to 13, a polyethylene terephthalate film was produced in the same manner as in Example 13, except that polyethylene terephthalate pellets obtained in each of Comparative Examples 1 to 3 were used as polyethylene terephthalate pellets. The properties of the resultant films are shown in Table 3.

TABLE 3

| | Conditions for preparation of polymer | Undrawn film quality Haze (%) | IV | L value | b value | L − b value | Thermal stability |
|---|---|---|---|---|---|---|---|
| | | | | Biaxially drawn film quality | | | |
| | | | | | Color | | |
| Example 13 | Example 5 | 0.3 | 0.58 | 78.0 | 3.5 | 74.5 | 0.04 |
| Example 14 | Example 6 | 0.3 | 0.58 | 79.0 | 3.2 | 75.8 | 0.04 |
| Example 15 | Example 7 | 0.2 | 0.55 | 78.0 | 3.9 | 74.1 | 0.05 |
| Comparative Example 11 | Comparative Example 1 | 1.0 | 0.57 | 70.0 | 6.0 | 64.0 | 0.05 |
| Comparative Example 12 | Comparative Example 2 | 0.3 | 0.52 | 83.0 | 10.0 | 73.0 | 0.11 |
| Comparative Example 13 | Comparative Example 3 | 0.6 | 0.54 | 83.0 | 6.0 | 77.0 | 0.08 |

Example 16

Polyethylene terephthalate pellets obtained in Example 5 were treated at 160° C. for 10 minutes, thereby to semicrystallize the polymer by using a high-speed system flow type crystallizing machine, and then further treated in a nitrogen gas flow at 160° C. for 4 hours, thereby to crystallize the polymer, and then dried. These pellets were transferred to a packing column type solid phase polymerization column, where these pellets were subjected to a solid phase polycondensation step in a nitrogen gas flow at 215° C. for 22 to 25 hours. The reaction time was controlled so that the IV value of the resultant polyethylene terephthalate becomes 0.760. The properties of the resulting polyethylene terephthalate are shown in Table 4.

Using the resultant polyethylene terephthalate pellets, a preform was produced in the following manner.

5 kg of polyethylene terephthalate was dried in a nitrogen gas flow at a temperature of 160° C. under the ambient atmospheric pressure for 10 hours or more using a tray dryer and dried polyethylene terephthalate was fed to an injection molding machine ("M-100DM", manufactured by MEIKI CO., LTD.) and then injection-molded into a cylindrical preform having an outer diameter of about 28 mm, an inner diameter of about 19 mm, a length of 136 mm, a body portion wall thickness of 4 mm and a weight of about 56 g under the conditions of a cylinder temperature of 275° C., a screw rotational speed of 160 rpm, a primary compression time of 3.0 seconds, a mold cooling temperature of 10° C. and a cycle time of 30 seconds. Sampling was conducted at a center portion of the body portion of the resultant preform, and then the IV value, haze, the acetaldehyde concentration and the cyclic trimer content were measured. These results are shown in Table 4.

Example 17

A polyethylene terephthalate preform molded article was produced in the same procedures as in Example 16, except that polyethylene terephthalate pellets obtained in Example 6 were used. The measuring results are shown in Table 4.

Comparative Examples 14 to 16

In each of Comparative Examples 14 to 16, a polyethylene terephthalate preform was produced in the same manner as in Example 16, except that polyethylene terephthalate pellets obtained in Comparative Examples 1 to 3 were used. The measuring results are shown in Table 4.

0.62, the tensile strength was 3.7 cN/dtex, the ultimate elongation was 23% and the height of a foreign matter deposited on the spinneret was 5 μm.

Example 19

Preparation of Recovered Dimethyl Terephthalate:

200 g of ethylene glycol was charged in a 500 ml separable flask and 1.5 g of sodium carbonate and 50 g of a polyethylene terephthalate scrap comprising ground PET bottles were charged, and then the temperature of this mixture was increased to 185° C. by heating with stirring. The mixture was left to stand in this condition for 4 hours. As a result, the polyethylene terephthalate scrap was melted and the depolymerization reaction thereof was completed. The resulting depolymerized product was concentrated by distilling under reduced pressure and 150 g of ethylene glycol was recovered as a distilled fraction.

This concentrated solution was mixed with 0.5 g of sodium carbonate as an esterification catalyst and 100 g of methanol was further added, and then this reaction mixture was stirred at a liquid temperature of 75° C. under the ambient atmospheric pressure for one hour, thereby to complete the transesterification reaction.

The resultant reaction mixture was cooled to 40° C. and filtered through a glass filter. The crude dimethyl terephthalate collected on the filter was charged into 100 g of methanol, heated to 40° C. and stirred to wash it, and then filtered through a glass filter again. The washing and filtering operations were repeated twice.

The crude dimethyl terephthalate collected on the filter was charged in a distillation device and distilled under reduced pressure of 6.65 kPa at a reflux ratio of 0.5, thereby to collect

TABLE 4

|  | Conditions for preparation of polymer | Polymer quality after solid phase polymerization | | | | | | Preform quality | | | |
|---|---|---|---|---|---|---|---|---|---|---|---|
|  |  |  | Color | | | Acetaldehyde | Cyclic trimer |  |  | Acetaldehyde | Cyclic trimer |
|  |  | IV | L value | b value | L − b value | content (ppm) | content (% by mass) | IV | Haze (%) | content (ppm) | content (% by mass) |
| Example 16 | Example 5 | 0.76 | 83 | 2.5 | 80.5 | 1.0 | 0.32 | 0.70 | 1.5 | 10 | 0.35 |
| Example 17 | Example 6 | 0.76 | 83 | 2.2 | 80.8 | 1.2 | 0.32 | 0.69 | 1.5 | 11 | 0.34 |
| Comparative Example 14 | Comparative Example 1 | 0.76 | 80 | 4.0 | 76.0 | 1.0 | 0.35 | 0.70 | 7.0 | 12 | 0.37 |
| Comparative Example 15 | Comparative Example 2 | 0.76 | 83 | 8.0 | 75.0 | 2.0 | 0.30 | 0.68 | 1.2 | 25 | 0.45 |
| Comparative Example 16 | Comparative Example 3 | 0.76 | 83 | 4.5 | 78.5 | 1.4 | 0.32 | 0.69 | 1.2 | 17 | 0.37 |

Example 18

In the same manner as in Example 6, polyethylene terephthalate was prepared, except that 0.041 g of petraerythritol-tetrakis[3-(3,5-di-tert-butyl-4-hydroxypheny)propionate] ("Irganox 1010", manufactured by Ciba Speciality Chemicals Inc.) was added to the oligomer after the completion of the esterification reaction. In the resulting polyethylene terephthalate pellets, the IV value was 0.63. With respect to the color tone, the L value was 81 and the b value was 1.9. With respect to the catalytic metal concentrations, the titanium concentration was 12 ppm and the phosphorus concentration was 15 ppm. These polyethylene terephthalate pellets were fed to the same fiber manufacturing process as in Example 9. In the resulting polyester fibers, the IV value was dimethyl terephthalate as a distilled fraction. The amount of the distilled fraction collected was 47 g. The amount of dimethyl terephthalate remaining in the distillation residue was measured. As a result, it was 2 g. The recovery ratio of dimethyl terephthalate was 93% by mass based on the mass of the polyester charged.

In the recovered dimethyl terephthalate refined by distillation, 0.5 ppm of dimethyl 2-hydroxyterephthalate was detected. The purity of the recovered dimethyl terephthalate purified was 99.9% by mass or higher.

Preparation of Catalyst:

131 g of ethylene glycol was mixed with 3.5 g of mono-n-butyl phosphate and this mixture was dissolved by heating at 120° C. for 10 minutes. To 134.5 g of this ethylene glycol solution, 40 g of ethylene glycol was added and 3.8 g of titanium tetrabutoxide was dissolved therein. The resultant reaction system was stirred at 120° C. for 60 minutes to cause the titanium compound to react with mono-n-butyl phosphate and to prepare a white slurry of catalyst containing the reaction product. The titanium content in this catalyst slurry was 0.3% by mass and the molar ratio ($m_{Ti}/m_P$) of the content of phosphorus atoms to the content of titanium atoms was 2.0.

Preparation of Polyester and Fibers:

In a reaction vessel equipped with a stirrer, a refining distillation column and a methanol distillation condenser, a mixture of 100 g of the recovered dimethyl terephthalate obtained by the above mentioned procedures, with 70 g of ethylene glycol, was mixed with 1.64 g of the titanium/phosphorus catalyst, and then this reaction mixture was subjected to a transesterification reaction while heating it from 140 to 240° C.

The reaction product-containing mixture liquid was transferred to a polycondensation reaction vessel and the polycondensation reaction was conducted therein under high vacuum of 26.67 Pa or lower by heating to 285° C. In the resulting polyester, the IV value was 0.63 and the DEG content was 0.7% by mass. The resulting polyester was formed into pellets and dried. The resulting dried polyester pellets were subjected to a melt-spinning step to produce an undrawn filament yarn of 333 dtex/36 filaments, and the undrawn filament yarn was drawn at a draw ratio of 4.0 to produce a drawn multifilament yarn having a yarn count of 83.25 dtex/36 filaments. The measurement results are shown in Table 5.

Example 20

Preparation of Recovered Dimethyl Terephthalate:

A recovered dimethyl terephthalate was prepared by the same procedures as in Example 19.

Preparation of Catalyst:

0.8 g of trimellitic anhydride was dissolved in 2.5 g of ethylene glycol and 0.7 g of titanium tetrabutoxide (0.5 mol % based on the molar amount of trimellitic anhydride used in the preparation of the polyester described hereinafter) was added dropwise into the resultant solution. This reaction system was left to stand in the air under the reaction conditions of 80° C. and the ambient atmospheric pressure for 60 minutes, thereby to react titanium tetrabutoxide with trimellitic anhydride and to age the reaction product. After the reaction system was cooled to room temperature and 15 g of acetone was added thereinto, the reaction product was collected by filtering through a filter paper No. 5 and dried at a temperature of 100° C. for 2 hours. The titanium content of the resultant reaction product was 11.2% by mass.

Next, 131 g of ethylene glycol was mixed with 3.5 g of mono-n-butyl phosphate and this mixture was dissolved by heating at 120° C. for 10 minutes. To 134.5 g of this ethylene glycol solution, 40 g of ethylene glycol was further added and then 5.0 g of the titanium compound was dissolved in the solution. The resultant reaction system was stirred at 120° C. for 60 minutes to cause the titanium compound to react with mono-n-butyl phosphate and to prepare a white slurry of catalyst containing the reaction product. The titanium content of this catalyst slurry was 0.3% by mass and the molar ratio ($m_{Ti}/m_P$) of the content of phosphorus atoms to the content of titanium atoms was 2.0.

Preparation of Polyester and Fibers:

In a reaction vessel equipped with a stirrer, a refining distillation column and a methanol distillation condenser, a mixture of 100 g of the recovered dimethyl terephthalate and 70 g of ethylene glycol was mixed with 1.64 g of the titanium/phosphorus catalyst, and then this reaction mixture was subjected to the transesterification reaction while heating from 140 to 240° C.

The reaction product-containing mixture solution was transferred to a polycondensation reaction vessel and, in the vessel, the polycondensation reaction was conducted under high vacuum of 26.67 Pa or lower by heating it to 285° C. In the resulting polyester, the IV value was 0.63 and the DEG content was 0.8% by weight. The resulting polyester was formed into pellets and dried. The resulting dried polyester pellets were subjected to a melt-spinning procedure to produce an undrawn filament yarn of 333 dtex/36 filaments, and the undrawn filament yarn was drawn at a draw ratio of 4.0 to produce a drawn multifilament yarn having a yarn count of 83.25 dtex/36 filaments. The measurement results are shown in Table 5.

Example 21

Preparation of Recovered Terephthalic Acid:

A recovered dimethyl terephthalate was prepared by the same procedures as in Example 19.

Then, 100 g of the recovered dimethyl terephthalate were mixed with 200 g of water and this mixture was stirred at 180° C. and fed into a hydrolysis reaction apparatus. The dimethyl terephthalate was hydrolyzed by heating the liquid temperature in the hydrolysis reaction apparatus to 250° C. with stirring and then methanol produced during this reaction was distilled off, together with water. The mass ratio of terephthalic acid to water in the resulting terephthalic acid/water slurry was about 1:1. The total content of 4-carboxybenzaldehyde, paratoluic acid, benzoic acid and dimethyl 2-hydroxyterephthalate in the resulting slurry was 1 ppm or less based on the mass of terephthalic acid.

Next, 166 g of the resulting terephthalic acid/water slurry and 4150 g of ethylene glycol were charged and mixed with each other in a centrifugal separator. The mass ratio of terephthalic acid/water/ethylene glycol was 1:1:50. This water/ethylene glycol slurry of terephthalic acid was treated by the centrifugal separator, thereby to collect a cake of terephthalic acid. The mass ratio of terephthalic acid/water/ethylene glycol in the terephthalic acid cake was about 83:0.4:14.3. Furthermore, ethylene glycol was added and mixed with this slurry, thereby to control the mass ratio of terephthalic acid/ethylene glycol of the terephthalic acid/ethylene glycol slurry to 66:34.

Preparation of Catalyst:

131 g of ethylene glycol was mixed with 3.5 g of mono-n-butyl phosphate and this mixture was dissolved by heating at 120° C. for 10 minutes. To 134.5 g of this ethylene glycol solution, 40 g of ethylene glycol was added and thereafter 3.8 g of titanium tetrabutoxide was dissolved in the solution. The resultant reaction system was stirred at 120° C. for 60 minutes to cause the titanium compound to react with mono-n-butyl phosphate and to prepare a white slurry of the catalyst, containing the reaction product. The titanium content in this catalyst slurry was 0.3% by mass and the molar ratio ($m_{Ti}/m_P$) of the content of phosphorus atoms to the content of titanium atoms was 2.0.

Preparation of Polyester and Fibers:

200 g of the terephthalic acid/ethylene glycol slurry was charged in a reaction vessel equipped with a stirrer, a refining distillation column and a methanol distillation condenser, and the esterification reaction was conducted at 270° C. under the pressure of 0.3 MPa for 240 minutes. After removing a half of the resultant reaction mixture, the remaining half was maintained at a temperature of 250° C. and 100 g of the recovered terephthalic acid/ethylene glycol slurry was fed thereinto under the ambient atmospheric pressure over 150 minutes. Then, the resultant reaction mixture was subjected to the esterification reaction and heated under the ambient atmospheric pressure for 90 minutes.

During the reaction, the temperature in the reaction system was maintained at 250° C. After removing a half of the resultant reaction mixture, 100 g of the recovered terephthalic acid/ethylene glycol slurry was fed to the remaining half by the same procedures as described above and the esterification reaction was repeated. The above-mentioned procedures were repeated until the content of diethylene glycol in the reaction product becomes constant.

After the DEG content in the reaction mixture became constant, a half of the reaction mixture obtained by this esterification reaction was transferred to a polycondensation reaction vessel and 1.27 g of the titanium/phosphorus catalyst was added thereinto. The resulting reaction system was heated to 285° C. and the polycondensation reaction was conducted under high vacuum of 26.67 Pa or lower by heating to 285° C. In the resulting polyester, the IV value was 0.63 and the DEG content was 1.0% by weight. The resultant polyester was formed into chips and dried. The resultant dried polyester chips were subjected to a melt-spinning procedures to produce an undrawn filament yarn of 333 dtex/36 filaments, and then the undrawn filament yarn was drawn at a draw ratio of 4.0 to produce a drawn multifilament yarn having a yarn count of 83.25 dtex/36 filaments. The measurement results are shown in Table 5.

Example 22

Preparation of Recovered Terephthalic Acid:
A recovered terephthalic acid was prepared by the same steps as in Example 21.

Preparation of Catalyst:
0.8 g of trimellitic anhydride was dissolved in 2.5 g of ethylene glycol and 0.7 g of titanium tetrabutoxide (0.5 mol % based on the molar amount of trimellitic anhydride used in the preparation of a polyester which will be described hereinafter) was added dropwise to this solution. This reaction system was left to stand in the air under the reaction conditions of 80° C. and the ambient atmospheric pressure for 60 minutes, thereby to react titanium tetrabutoxide with trimellitic anhydride and to age the reaction product. After the reaction system was cooled to room temperature and 15 g of acetone was added thereto, the reaction product was collected by filtering through a filter paper No. 5 and dried at a temperature of 100° C. for 2 hours. The titanium content in the resulting reaction product was 11.2% by mass.

Next, 131 g of ethylene glycol was mixed with 3.5 g of mono-n-butyl phosphate and this mixture was dissolved by heating at 120° C. for 10 minutes. To 134.5 g of this ethylene glycol solution, 40 g of ethylene glycol was added and 5.0 g of the titanium compound was dissolved in the solution. The resultant reaction system was stirred at 120° C. for 60 minutes to cause the titanium compound to react with mono-n-butyl phosphate and to prepare a white slurry of catalyst containing the reaction product. The titanium content of this catalyst slurry was 0.3% by mass and the molar ratio ($m_{Ti}/m_P$) of the content of phosphorus atoms to the content of titanium atoms was 2.0.

Preparation of Polyester and Fibers:
200 g of the terephthalic acid/ethylene glycol slurry prepared in the above mentioned procedures were charged in a reaction vessel equipped with a stirrer, a refining distillation column and a methanol distillation condenser and an esterification reaction was conducted at 270° C. under the pressure of 0.3 MPa for 240 minutes. After removing a half of the resulting reaction mixture, the remaining half was maintained at a temperature of 250° C. and 100 g of the recovered terephthalic acid/ethylene glycol slurry was fed thereinto under the ambient atmospheric pressure over 150 minutes. Then, the resultant reaction mixture was subjected to the esterification reaction and heated under the ambient atmospheric pressure for 90 minutes.

During the reaction, the temperature in the reaction system was maintained at 250° C. After removing a half of the resultant reaction mixture, 100 g of the recovered terephthalic acid/ethylene glycol slurry was fed to the remaining half by the same procedures as described above and the esterification reaction was repeated. The above procedures were repeated until the DEG content in the reaction product becomes constant.

After the DEG content in the reaction mixture became constant, a half of the reaction mixture obtained by this esterification reaction was transferred to a polycondensation reaction vessel and 1.27 g of the titanium/phosphorus catalyst was added thereto. The resulting reaction system was heated to 285° C. and the polycondensation reaction was conducted under high vacuum of 26.67 Pa or lower. In the resultant polyester, the IV value was 0.63 and the DEG content was 1.0% by weight. The resultant polyester was formed into pellets and dried. The resulting dried polyester pellets were subjected to a melt-spinning step to produce an undrawn filament yarn of 333 dtex/36 filaments, and the undrawn yarn was drawn at a draw ratio of 4.0 to produce a drawn multifilament yarn having a yarn count of 83.25 dtex/36 filaments. The measurement results are shown in Table 5.

TABLE 5

|  | Polymer quality | | | | Yarn quality | | |
|---|---|---|---|---|---|---|---|
|  |  | DEG content | Color | | Tensile strength | Ultimate elongation | Height of foreign matter deposited on |
|  | IV | (% by mass) | L value | b value | L − b value | (cN/dtex) | (%) | spinneret (μm) |
| Example 19 | 0.63 | 0.8 | 79.8 | 3.1 | 76.7 | 3.8 | 25 | 2 |
| Example 20 | 0.63 | 0.8 | 80.1 | 3.2 | 76.9 | 3.7 | 26 | 3 |

TABLE 5-continued

| | Polymer quality | | | | Yarn quality | | |
| | | | | | Tensile strength | Ultimate elongation | Height of foreign matter deposited on |
| | IV | DEG content (% by mass) | Color L value | b value | L − b value | (cN/dtex) | (%) | spinneret (μm) |
|---|---|---|---|---|---|---|---|---|
| Example 21 | 0.63 | 1.0 | 79.9 | 2.9 | 77.0 | 3.7 | 26 | 2 |
| Example 22 | 0.63 | 1.0 | 80.2 | 3.1 | 77.1 | 3.6 | 25 | 3 |

The invention claimed is:

1. A catalyst for preparation of a polyester, comprising a reaction product of:

(A) a titanium compound component comprising at least one member selected from titanium compounds (1) represented by the general formula (I):

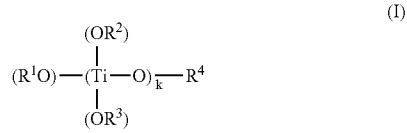

in which formula (i), $R^1$, $R^2$, $R^3$ and $R^4$ respectively and independently from each other represent an alkyl group having 2 to 10 carbon atoms, k represents an integer of 1 to 3 and, when k is 2 or 3, two or three $R^2$ and $R^3$ substituents are the same as or different from each other, and titanium compounds (2) obtained by reacting the titanium compounds (1) of the general formula (I) with aromatic polycarboxylic acids represented by the general formula (II):

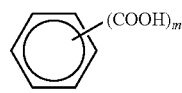

in which formula (II), m represents an integer of 2 to 4, or anhydrides of the acids of the formula (II); and (B) a phosphorus compound component comprising at least one member of phosphorus compounds (3) represented by the general formula (III):

in which formula (III), $R^5$ represents a non-substituted or substituted aryl group having 6 to 20 carbon atoms, or a non-substituted or substituted alkyl group having 1 to 20 carbon atoms, wherein, in the reaction product of the titanium compound component (A) with the phosphorus compound component (B):

(1) acetic acid is contained, and (2) a reaction molar ratio ($m_{Ti}/m_P$) of a molar amount ($m_{Ti}$), in terms of titanium atoms, of the titanium compound component (A) to a molar amount ($m_P$), in terms of phosphorus atoms, of the phosphorus compound component (B) is within the range of 1:1.9 to 1:3.

2. The catalyst for preparation of a polyester according to claim 1, wherein the titanium compounds (1) of the formula (I) are selected from the group consisting of titanium tetraalkoxides, octaalkyl trititanates and hexaalkyl dititanates.

3. The catalyst for preparation of a polyester according to claim 1, wherein the aromatic polycarboxylic acids of the formula (II) and the anhydrides thereof are selected from phthalic acid, trimellitic acid, hemimellitic acid and pyromellitic acid and anhydrides thereof.

4. The catalyst for preparation of a polyester according to claim 1, wherein the titanium compounds (2) are reaction products of the titanium compounds (1) of the formula (I) with the aromatic polycarboxylic acids of the formula (II) or the anhydrides thereof at a reaction molar ratio of 2:1 to 2:5.

5. The catalyst for preparation of a polyester according to claim 1, wherein the phosphorus compounds (3) of the formula (III) are selected from the group consisting of monomethyl phosphate, monoethyl phosphate, monotrimethyl phosphate, mono-n-butyl phosphate, monohexyl phosphate, monoheptyl phosphate, monooctyl phosphate, monononyl phosphate, monodecyl phosphate, monododecyl phosphate, monolauryl phosphate, monooleyl phosphate, monotetradecyl phosphate, monophenyl phosphate, monobenzyl phosphate, mono(4-dodecyl)phenyl phosphate, mono(4-methylphenyl) phosphate, mono(4-ethylphenyl) phosphate, mono(4-propylphenyl) phosphate, mono(4-dodecylphenyl) phosphate, monotolyl phosphate, monoxylyl phosphate, monobiphenyl phosphate, mononaphthyl phosphate and monoanthryl phosphate.

6. The catalyst for preparation of a polyester according to claim 1, comprising a reaction product of the titanium compound component (A) comprising at least one member of the titanium compounds of the formula (I) in which k represents 1, with the phosphorus compound component (B) comprising at least one member of the phosphorus compounds (3) of the formula (III).

7. The catalyst for preparation of a polyester according to claim 6, wherein the reaction product of the titanium compound component (A) composed of at least one member of the titanium compounds of the formula (I) in which k represents 1 with the phosphorus compound component (B) composed of at least one member of the phosphorus compounds (3) of the formula (III) comprises a compound represented by the following formula (IV):

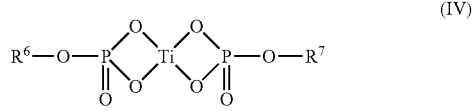

in which formula (IV), $R^6$ and $R^7$ respectively and independently from each other represents an alkyl group having 2 to 10 carbon atoms or an aryl group having 6 to 12 carbon atoms.

8. The catalyst for preparation of a polyester according to claim 1, wherein the reaction product of the titanium compound component (A) with the phosphorus compound component (B) is one produced at a reaction temperature of 70 to 200° C.

9. The catalyst for preparation of a polyester according to claim 1, wherein the reaction molar ratio ($m_{Ti}/m_P$) is in the range of 1:2 to 1:3.

10. A process for preparing a polyester, comprising subjecting a polymerization starting material comprising at least one member selected from the group consisting of esters of aromatic dicarboxylic acids with alkylene glycols and a low polymerization degree polymers of the esters to a polycondensation reaction in the presence of the catalyst for preparation of a polyester as claimed in any one of claims 1, 2 to 8.

11. The process for preparing a polyester according to claim 10, wherein the titanium atoms contained in the catalyst is in an amount in millimoles of 2 to 40% based on the total amount in millimoles of the aromatic dicarboxylic acid component contained in the polymerization starting material.

12. The process for preparing a polyester according to claim 10, wherein the aromatic dicarboxylic acids are selected from terephthalic acid, isophthalic acid, naphthalenedicarboxylic acid, diphenyldicarboxylic acid, diphenylsulfonedicarboxylic acid, diphenylmethanedicarboxylic acid, diphenyl ether dicarboxylic acid, diphenoxyethanedicarboxylic acid and β-hydroxyethoxybenzoic acid.

13. The process for preparing a polyester according to claim 12, wherein terephthalic acid is one obtained by depolymerizing a polyalkylene terephthalates and hydrolyzing the resulting dimethyl terephthalate.

14. The process for preparing a polyester according to claim 10, wherein the esters of the aromatic dicarboxylic acids with the alkylene glycols are esters of terephthalic acid with an alkylene glycols and are ones obtained by depolymerizing polyalkylene terephthalates and transesterifying the resulting dimethyl terephthalate with the alkylene glycols.

15. The process for preparing a polyester according to claim 13, wherein the polyalkylene terephthalates to be depolymerized are discarded polyalkylene terephthalate molded articles and/or polymer scraps recovered in the manufacturing process of the polyalkylene terephthalates.

16. The process for preparing a polyester according to claim 10, wherein the alkylene glycols are selected from the group consisting of ethylene glycol, trimethylene glycol, tetramethylene glycol, neopentyl glycol and hexamethylene glycol.

17. The process for preparing a polyester according to claim 10, wherein the polycondensation reaction is conducted at a temperature of 230 to 320° C.

18. A polyester prepared by the process as claimed in claim 10.

19. The polyester according to claim 18, wherein the content of cyclic trimers of esters of the aromatic dicarboxylic acids with the alkylene glycols and having an intrinsic viscosity of 0.70 to 0.90 is 0.50% by weight or less and the content of acetaldehyde is 5 ppm or less.

20. The polyester according to claim 18, further comprising an antioxidant comprising at least one hindered phenol compound in an amount of 1% by mass or less, based on the amount in mass of the polyester.

21. A molded article comprising the polyester as claimed in any one of claim 18.

22. The molded article according to claim 21 selected from the group consisting of bottle-shaped articles, sheet-shaped articles, thermally molded containers and injection molded articles.

23. A polyester fiber obtained by melting a resin material comprising the polyester as claimed in claim 18, extruding the melt into a filamentary form and solidifying the extruded filamentary melt.

24. A polyester film obtained by melting a resin material comprising the polyester as claimed in claim 18, extruding the melt into a sheet form, solidifying the sheet formed melt and drawing the resulting undrawn film in biaxial directions.

25. The process for preparing a polyester according to claim 14, wherein the polyalkylene terephthalates to be depolymerized are discarded polyalkylene terephthalate molded articles and/or polymer scraps recovered in the manufacturing process of the polyalkylene terephthalates.

26. A process for producing a catalyst for preparation of a polyester comprising:
reacting (A) a titanium compound component comprising at least one member selected from titanium compounds (1) represented by the general formula (I):

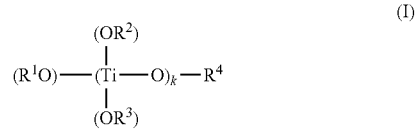

(I)

in which formula (I), $R^1$, $R^2$, $R^3$ and $R^4$ respectively and independently from each other represent an alkyl group having 2 to 10 carbon atoms, k represents an integer of 1 to 3 and, when k is 2 or 3, two or three $R^2$ and $R^3$ substituents are the same as or different from each other, and titanium compounds (2) obtained by reacting the titanium compounds (1) of the general formula (I) with aromatic polycarboxylic acids represented by the general formula (II):

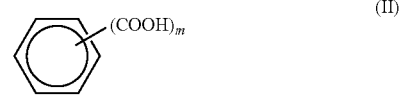

(II)

in which formula (II), m represents an integer of 2 to 4, or anhydrides of the acids of the formula (II); with (B) a phosphorus compound component comprising at least one member of phosphorus compounds (3) represented by the general formula (III):

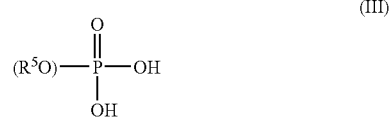

(III)

in which formula (III), $R^5$ represents a non-substituted or substituted aryl group having 6 to 20 carbon atoms, or a non-substituted or substituted alkyl group having 1 to 20 carbon atoms,
wherein the reaction of the titanium compound component (A) with the phosphorus compound component (B) is carried out:
(1) in a reaction medium consisting of ethylene glycol in the presence of acetic acid,
(2) at a reaction temperature in the range of from 70 to 200° C., and
(3) at a reaction molar ratio ($m_{Ti}/m_P$) of a molar amount ($m_{Ti}$), in terms of titanium atoms, of the titanium compound component (A) to a molar amount ($m_P$), in terms of phosphorus atoms, of the phosphorus compound component (B) within the range of 1:1.9 to 1:3.

27. The process for preparing a catalyst as claimed in claim 26, wherein the reaction molar ratio ($m_{Ti}/m_P$) is in the range of 1:2 to 1:3.

* * * * *